United States Patent [19]

Coulter

[11] 3,743,424
[45] July 3, 1973

[54] COMBINED ELECTRONIC AND OPTICAL METHOD AND APPARATUS FOR ANALYZING LIQUID SAMPLES

[75] Inventor: Wallace H. Coulter, Hialeah, Fla.
[73] Assignee: Coulter Electronics, Inc., Hialeah, Fla.
[22] Filed: Nov. 19, 1970
[21] Appl. No.: 91,130

[52] U.S. Cl. ............... 356/73, 324/71 CP, 356/40, 356/181, 356/184, 356/186
[51] Int. Cl. ............................................. G01n 21/26
[58] Field of Search ............................ 324/71 CP; 356/39–42, 36, 72, 73, 180, 181, 184, 186, 256, 102; 23/253 R

[56] References Cited
UNITED STATES PATENTS

| | | | |
|---|---|---|---|
| 3,597,161 | 8/1971 | Greiner | 23/253 R |
| 3,622,795 | 11/1971 | Dorman et al. | 356/39 X |
| 3,271,671 | 9/1966 | Coulter | 324/71 CP |
| 3,271,672 | 9/1966 | Henderson | 324/71 CP |
| 2,915,938 | 12/1959 | Hughes | 256/42 X |
| 3,010,798 | 11/1961 | Whitehead et al. | 356/72 X |
| 3,166,929 | 1/1965 | Pelavin | 356/72 X |
| 3,241,432 | 3/1966 | Skeggs et al. | 356/181 X |
| 3,439,267 | 4/1969 | Coulter et al. | 324/71 |
| 3,502,412 | 3/1970 | Burns | 356/40 |
| 3,549,994 | 12/1970 | Rothermel et al. | 356/39 X |

Primary Examiner—Ronald L. Wibert
Assistant Examiner—F. L. Evans
Attorney—Silverman & Cass

[57] ABSTRACT

An electronic particle counting device operating on the Coulter principle is combined with an optical hemoglobinometer such that at some step in the sequence of events of the operation of the counting device, the operation of the optical hemoglobinometer is started. The same sample suspension that is utilized in the counting device is also utilized in the hemoglobinometer by means of a fluid connection from the counting device to the hemoglobinometer so that there is no need to handle the sample twice. The action of the counting device in starting the hemoglobinometer is automatic.

14 Claims, 3 Drawing Figures

INVENTOR
WALLACE H. COULTER
By Silverman & Cass
ATTORNEYS

| | START | | | | | | | | | | | STOP | | |
|---|---|---|---|---|---|---|---|---|---|---|---|---|---|---|
| | ↓ | 2 | | 4 | | 6 | | 8 | | 10 | | 12 ↓ | | 14 |
| READ STANDARD | ■ | | | | | | | | | | | | | |
| VALVE 1 OPEN | | ■ | ■ | ■ | | | | | | | | | | |
| VALVE 1 CLOSED | ■ | | | | ■ | ■ | ■ | ■ | ■ | ■ | ■ | ■ | ■ | ■ |
| READ SAMPLE | | | | | | ■ | | | | | | | | |
| VALVE 2 OPEN | | | | | | | ■ | ■ | ■ | | | | | |
| VALVE 2 CLOSED | | ■ | ■ | ■ | ■ | ■ | | | | ■ | ■ | ■ | ■ | ■ |
| PUMP OPERATES | | ■ | ■ | ■ | | ■ | ■ | | | | | | | |
| RESET | | | | | | | | | | | ■ | ■ | | |

INVENTOR
WALLACE H. COULTER

By Silverman & Cass
ATTORNEYS

COMBINED ELECTRONIC AND OPTICAL METHOD AND APPARATUS FOR ANALYZING LIQUID SAMPLES

BACKGROUND OF THE INVENTION

In the measurement of the hemoglobin content of blood, one may use a sample which is a suspension of white blood cells in a saline electrolyte. The sample is made by adding a lysing agent and a hemoglobin reagent to a suspension of diluted whole blood. The lysing agent destroys the red cells and releases their contents into solution, and this resulting suspension has the coloring matter produced by the broken red cells and the unaffected white cells. A reagent is also added to fix the hemoglobin in solution so that the color will be retained and made available for measurement.

A widely known and used particle counting and sizing device utilizes the Coulter principle in its operation. Although capable of giving information on a wide range of particles, most of these apparatuses are used in clinical laboratories for blood cell work where information on hemoglobin content of the blood is required as often as the number of blood cells is required. For the counting of white cells, as explained, the red cells are lysed in a dilution using a lysing agent which normally comprises saponin, and to this dilution is added a reagent which will enable a cyanomet determination of hemoglobin to be made using the same sample. The sample has in the past been handled twice, one time in the counting device and another time in the hemoglobinometer. The disadvantages of handling a sample twice are obvious, and include possibilities of error, spillage and loss of time.

The invention contemplates elimination of these disadvantages by requiring that the sample be handled only once. Operation of the counting device automatically causes operation of the optical hemoglobinometer and the same sample container is used for both apparatuses.

The operation of the counting device portion of the invention is disclosed in U.S. Pat. Nos. 2,656,508 and 2,869,078. The first of these describes the principle which has been referred to above as the Coulter principle, that is, causing particles to pass through a minute aperture whose effective impedance is changed with the passage of each particle in an amount which is proportional to the size of the particle. The apparatus which utilizes this principle has an electric current across the aperture and detects and counts the signals produced by the particles of a known volume as they pass through the aperture. The second of these patents describes apparatus which automatically starts the operation of the counting device merely by turning a stopcock, meters the required volume to pass through the aperture, and then turns the counting device off. This latter specific apparatus is not essential to the operation of the apparatus of the invention, but provides an efficient way of turning the hemoglobinometer on and off automatically. This is especially advantageous because of the existence of so many of the counting devices using the Coulter principle in laboratories today, and requires no modification of the counting device and its metering apparatus.

CROSS-REFERENCE TO OTHER PATENTS

The operation and construction of the optical hemoglobinometer portion of the invention may be in accordance with the disclosures in U.S. Pat. Nos. 3,566,133 and 3,622,795.

SUMMARY OF THE INVENTION

According to the invention, a dilution of blood in a suitable diluent is lysed by means of a lysing agent and treated with a suitable reagent to enable a cyanomet hemoglobin measurement to be made from the resulting sample. The sample is placed in a vessel which serves as one vessel of the counting device of an electronic counter operating in accordance with the Coulter principle. The optical hemoglobinometer makes a fluid connection with the one vessel by way of a thief. The electronic counting device is set in operation, and at one point of the sequence of events which occurs in the counting device, the hemoglobinometer is automatically set into operation also. For this purpose there is an electrical connection also between the hemoglobinometer and the electronic counting device.

One manner in which the apparatus is operated is by the use of a manometer-syphon arrangement associated with the counting device, this arrangement including a metering section having start and stop electrodes, with the programming means of the hemoglobinometer connected to one of the electrodes. Turning the stopcock to start the manometer-syphon operating will therefore also serve to start the hemoglobinometer.

DESCRIPTION OF THE PREFERRED EMBODIMENT

Figure 1:
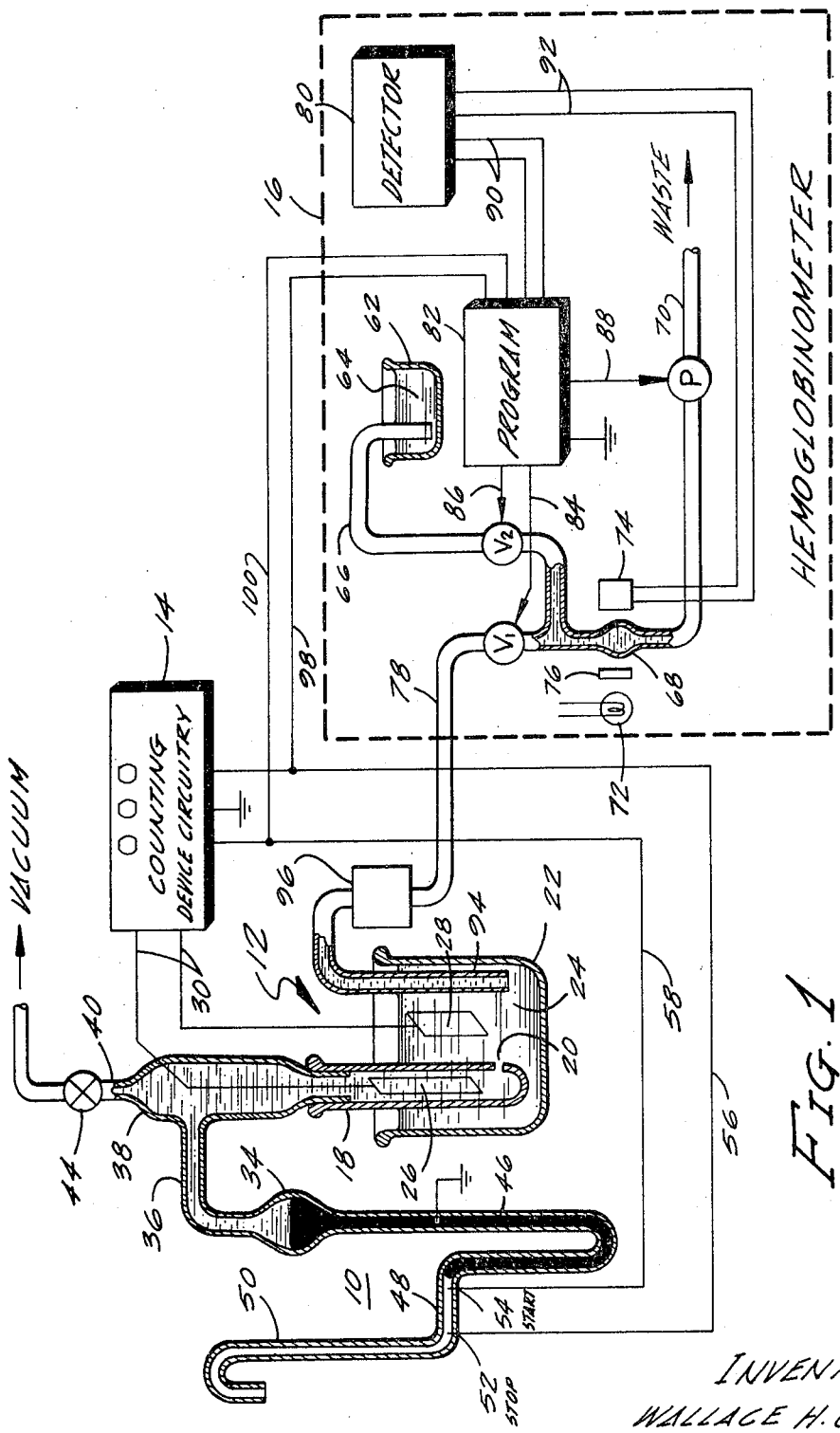
FIG. 1 is a schematic diagram illustrating the apparatus of the invention.

As previously mentioned, the invention comprises the combination of a Coulter type electronic particle counting device and an optical hemoglobinometer. The electronic particle counting device is constituted by the manometer-syphon apparatus 10; the vessel and electrode system 12; and the electronics providing the source of current for the aperture, the detector and counting circuitry, this being represented by the block 14. The hemoglobinometer is represented by the block 16.

The operation of the counting device portion of the invention is taught by the disclosures of U.S. Pat. Nos. 2,656,508 and 2,869,078. The operation of the hemoglobinometer portion of the invention is taught by the disclosure in U.S. Pat. Nos. 3,566,133 and 3,622,795.

The counting device 14 with its manometer-syphon apparatus 10 and its vessel and electrode system operate on the basis of the Coulter principle. A suspension of particles in a conductive diluent is caused to flow through a minute aperture between a pair of vessels at the same time that an electric current flows through this same aperture. Each time that a particle passes through the aperture, it causes a change in the impedance of the effective volume of suspension that is contained in the aperture, and this will produce a signal whose amplitude is proportional to the volume of the particle and whose duration is equal to the time during which the particle was traversing the aperture. Such signals can be electronically sized and counted to study the suspension.

The two vessels above-described comprise the aperture tube 18 having a minute aperture 20 in one wall thereof, and the larger beaker 22 having the suspension 24 therein within which the aperture tube 18 is immersed. An electrode 26 in the aperture tube 18 and another electrode 28 in the outer vessel 22 are connected by the leads 30 to the detector portion of the counter 14 and also to the source of aperture current. Being in contact with the diluent, these electrodes enable the detection of the signals produced by the passage of particles through the aperture 20.

The manometer-syphon apparatus comprises a manometer 32 connected by way of a reservoir 34 and a conduit 36 with the multi-branch header 38 that has a liquid-tight connection with the upper end of the aperture tube 18. An upper branch 40 has a manual stopcock 42 therein, which when open, connects the header 38 to a source of vacuum. The manometer 32 carries a column of mercury 46 therein, the movement of which provides the syphoning effect. The manometer connects to the atmosphere through a metering section 48 and a standpipe 50. The manometer 32, metering section 48 and standpipe are normally formed of capillary glass tubing. The aperture tube 18 and vessel 22 as well as the header 38 and conduit 36 are also formed of glass or some other insulating material.

The metering section 48 has two electrodes 52 and 54 set into the same and connecting with external leads 56 and 58, respectively. The column of mercury 46 is grounded at 60 by means of an electrode set into the wall of the manometer 32. The leads 56 and 58 connect with stop and start switches that energize the counter portion of the electronic circuitry 14.

The operation of the apparatus is initiated by the simple expedient of connecting the header 38 to the source of vacuum and this is done by opening the valve 44. The condition of the mercury column 46 becomes as shown in the drawing, with the mercury unbalanced and to the right of the start electrode 54. The counter portion of the device 14 has in the meantime been reset to zero. The vacuum applied to the body of fluid within the closed system comprising the aperture tube 18, the header 38 and the conduit 36 cannot draw the suspension 24 through the aperture 20 as readily as it can draw the mercury column 46 out of balance. After the situation depicted has been reached, the valve 44 is closed. Thereafter, the mercury column 46 starts to move to a condition of equilibrium.

In so moving, the column commences to draw the suspension 24 through the aperture 20, the aperture current having in the meantime been turned on. No counting will occur until the mercury column reaches the start electrode 54, and at this time counting will start, since the circuit is completed from ground 60 through start electrode 54 and the lead 58 to a suitable switch device (not shown). The counting continues as the mercury column traverses the metering section 48 on its way toward equilibrium. As soon as it reaches the electrode 52, the circuit is completed to ground through the lead 56 and the column of mercury 46 and this operates a stop switch device (not shown) that stops the counting. Since fluid is normally incompressible, the volume of the capillary tubing constituting the metering section 48 is equal to the volume of suspension 24 that has been drawn through the aperture in the time that the counter was turned on. This enables the count to be related to a particular volume of the suspension so drawn and, since the dilution is known, the concentration of particles is readily ascertained.

As thus far described, the apparatus is known. In the case of white blood cells, the suspension 24 comprises a red blood cell suspension that has been lysed with a suitable lysing agent. Certain other reagents may be added to stabilize the white blood cell suspension and render it suitable for making hemoglobin determinations.

The hemoglobinometer 16 may operate on the basis of the apparatus disclosed in U.S. Pat. Nos. 3,566,133 and 3,622,795. Basically a standard solution is viewed by an optical colorimeter to obtain a value of the absorbance of the solution. This information is stored in a suitable storage circuit. Then the test sample is viewed by the same colorimeter, and its absorbance compared with that of the standard. The standard comprises the diluent used to make the sample, so that the difference in absorbance is a measure of the absorbance of the material which is causing the change in color. In the case of the hemoglobinometer, this difference is related to the hemoglobin content of the blood sample.

The hemoglobinometer 16 has a source 62 of diluent 64 that is connected by way of the conduit 66 and the valve V2 to the optical measuring chamber 68. The chamber 68 is drained to waste by means of a conduit 70 and the pump P. The chamber is interposed between a light source 72 and a photo-responsive deice 74, with one or more intervening filters, collimator lenses and the like as designated generally by the element 76. The conduit 78 and the valve V1 are used to bring the sample to the chamber 68. The device 74 is connected to the detector 80 which has circuitry providing for the comparison of the absorbances and suitable means to read and display the value of the difference. A suitable programming device 82 electrically controls the operation of the valves V1 and V2, the pump P and the detector 80 through the several channels which are designated 84, 86, 88 and 90. The output of the photoresponsive device 74 is likewise fed into the detector 80 by way of the channel 92.

According to the invention, the operation of the electronic counting device and the hemoglobinometer occur simultaneously and are both initiated by the operation of the valve 44, being automatically started and stopped by the manometer-syphon system 10. The intake conduit 78 leads to a thief 94 immersed in the suspension 24 contained in the vessel 22. An intervening drip chamber 96 is provided in the conduit 78 to break the electrolytic path between the vessel system 12 and the hemoglobinometer so that there will be no electrical leakage or noise generated in the operation of the counting device. Such chamber is disclosed in U.S. Pat. Nos. 3,340,470 and 3,340,471. The programming device 82 is started and may be stopped by the same circuitry that starts and stops the operation of the counter of the counting device. Thus, the leads 98 and 100 connect respectively to the leads 56 and 58.

The operation of the apparatus may be explained in connection with the timed program illustrated in FIG. 2. The initial condition is assumed to be with a quantity of the standard 64 in the chamber 68. As soon as the mercury column 46 touches the start electrode 54, the programming device 82 commences to operate. The first function which it performs is to command the detector 80 to read the absorbance of the standard which is in the chamber 68 and electronically to store this information. Both valves are closed at this time, and the pump P may or may not be operating. Preferably it is inoperative. About 2 seconds later, the valve V1 opens and the pump P commences to operate. This continues for a length of time sufficient to draw a quantity of the suspension 24 out of the vessel 22 into the chamber 68 and wash the standard out of the chamber to waste, say three seconds. At this point the pump P is disabled and the valve V1 is closed. Thereafter the programming device 82 commands the detector 80 to read the absorbance of the suspension in the chamber 68. This is done, the comparison is made and the value of hemoglobin appears in the read-out of the detector 80. Thereafter, the valve V2 is opened and the pump P is operated, both occurring for a sufficient length of time to wash the sample out of the chamber 68 and replace it with the standard, say for three seconds. At the end of that time, the valve V2 is closed, trapping the standard in the chamber 68, the pump being disabled once more.

At this point the cycle of the hemoglobinometer is completed, and the programming device may de-energize itself. Standard 64 remains in the chamber for the next hemoglobin determination. Instead of de-energizing itself, the programming device may be de-energized by the closing of the stop circuit by the mercury column 46. The normal sample volume of a Coulter electronic counting device is such that it may require approximately fifteen seconds for a white cell determination. The hemoglobinometer cycle can be completed in approximately ten seconds or even less, so that the programming device can be de-energized any time after the cycle has been completed. Instead of de-energizing the same, this may be a re-set of the programming device depending upon its construction and operation, which are capable of wide variation. The diagram of FIG. 2 shows a reset period of time of operation of the programming device 82.

The programming device 82 may be provided with a plurality of switches operated by a series of cams driven by a suitable timing motor. The hemoglobinometer may use the same power supply as that of the counting device or it may have its own.

Figures 2, 3:
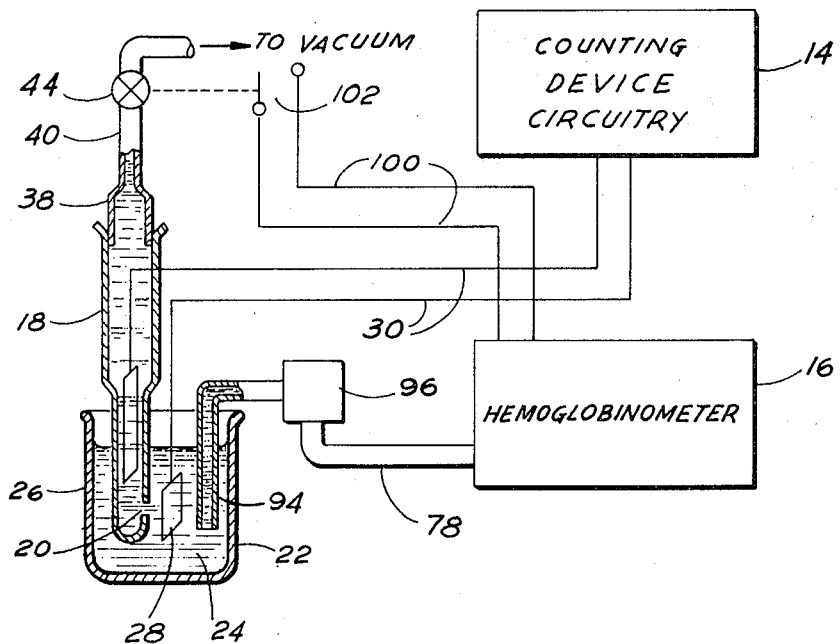
FIG. 2 is a time chart of the sequence of operation of the hemoglobinometer portion of the invention.
FIG. 3 is a diagram similar to that of FIG. 1 but illustrating a modified form of the invention.

In FIG. 3 there is illustrated a schematic diagram of a modified form of the invention. In this instance there is no manometer-syphon arrangement. Instead a different means may be used to operate the counting device, such as for example a timing device (not shown) that opens the connection 40 to the vacuum for a period of time during which it is known a predetermined volume of liquid will pass through the aperture 20 and then closes it. In this case, the valve 44 may be mechanically connected to a switch 102 which in turn completes the circuit of the lead 100 so that the operation of the hemoglobinometer is initiated.

Obviously the starting of the hemoglobinometer may be initiated by means of the stop contact 52 completing a circuit for energizing the hemoglobinometer. Any mechanical or electrical activity of the counting device may be used to start the operation of the hemoglobinometer.

What it is desired to secure by Letters Patent of the U.S. is:

I claim:

1. Apparatus for counting the white cells in a sample suspension of white cells in a diluent and also measuring the hemoglobin in the same sample, the suspension having been formed by lysing a blood dilution to provide only white cells and to release the hemoglobin from the red cells, which comprises:
   A. a particle counting device wherein particles are caused to move through an aperture whose effective impedance is changed with the passage of each particle therethrough, the change in impedance generating an electrical signal which can be counted, said device having means producing a sequence of events in the process of counting the white cells of said sample suspension,
      i. said counting device including an aperture tube having said aperture,
      ii. a vessel having a quantity of the suspension therein and the aperture tube immersed in said vessel with the aperture below the surface of said suspension,
      iii. said sequence of events including drawing suspension from the vessel into the interior of said aperture tube, starting the count of cells and stopping the count of cells,
   B. an optical hemoglobinmeter operable to measure the hemoglobin of the said suspension,
   C. fluid connection means for drawing a quantity of said suspension from said vessel into said hemoglobinometer,
   D. programming means for operating the hemoglobinometer, and
   E. a connection between said programming means and the means producing a sequence of events whereby the occurrence of one of said events will start the operation of said programming means.

2. The apparatus as claimed in claim 1 in which said one of said events comprises drawing suspension from said vessel into the interior of said aperture tube.

3. The apparatus as claimed in claim 1 in which said one of said events comprises starting the count of cells.

4. The apparatus as claimed in claim 1 in which said one of said events comprises stopping the count of cells.

5. The apparatus as claimed in claim 1 in which said means producing a sequence of events comprise a manometer-syphon system connected to the interior of the aperture tube and having a metering section with start and stop electrodes, a column of mercury adapted to be unbalanced and moved away from the start and stop electrodes, a connection from the interior of the aperture tube to a source of vacuum to apply suction to the interior of the aperture tube whereby to unbalance the column of mercury and including a valve for opening and closing said last-mentioned connection, said particle counting device having start and stop means for commencing and stopping the count of cells, said device being energized when said mercury column contacts said start and stop electrodes respectively during its return to its balanced condition.

6. The apparatus as claimed in claim 5 in which there is an electrical circuit operable when closed to energize the programming means including said connection between said programming means and the means producing a sequence of events, said last-named connection being connected to said start electrode.

7. The apparatus as claimed in claim 6 in which there is a second electrical circuit operable when closed to de-energize the programming means and including a second connection between said programming means and the means producing a sequence of events, said second connection being connected to said stop electrode.

8. The apparatus as claimed in claim 1 in which there is a liquid connection from the interior of the aperture tube connected to a source of vacuum and there being a valve in said connection, the valve having a mechanical connection with an electrical switch, and the connection between the programming means and means producing a sequence of events comprises an electrical circuit which is closed and opened by the operation of said switch.

9. Apparatus for counting a suspension of particles in a diluent and measuring the absorbance of the same suspension, which comprises:
   A. an electronic particle counting device including first and second vessels with the first immersed in the second and having an aperture in the first and the suspension in the second, the first vessel being filled with diluent, a manometer-syphon system having a liquid connection to the interior of the first vessel and having a column of mercury which is displaced from an equilibrium condition and returned to equilibrium condition while drawing a volume of suspension from the second vessel through the aperture, the manometer-syphon system including a metering section with start and stop electrodes at the beginning and end thereof, respectively, an electronic counter, operable to start operation when the mercury column reaches the start electrode and stop operation when the column reaches the stop electrode, including external connections from the electrodes extending to the counter and operating start and stop means in said counter, the manometer-syphon system including a connection to vacuum from the interior of the first vessel which connection is opened to cause the column of mercury to move to a non-equilibrium condition and closed to permit return of the column to equilibrium condition,
   B. a colorimeter including a chamber, a source of diluent, means for moving a quantity of diluent from the source into the chamber and means for measuring the absorbance of said diluent, means for displacing the diluent by a quantity of said suspension and measuring the absorbance of said suspension, means for comparing the two measurements and providing a read-out of the comparison and controlling means for programming the sequence of operation of the colorimeter,
   C. a fluid connection between the colorimeter and the second vessel to enable the colorimeter to draw suspension from said second vessel into said chamber, and
   D. an electrical circuit from the controlling means at least including said start electrode and means to initiate operation of said controlling means when the start electrode is contacted by the mercury column,
whereby the operation of the colorimeter and the counting of the particle counting device are initiated by first moving the mercury column to its non-equilibrium condition and then permitting it to return to equilibrium condition.

10. Apparatus as claimed in claim 9 in which means are provided in the fluid connection between the colorimeter and second vessel to break any electrical connection which may also exist.

11. In combination,
   A. an electronic counting device comprising:
      i. an aperture tube having an aperture in a wall thereof, and being filled with diluent, immersed in a sample suspension contained in a second vessel,
      ii. a source of vacuum connected to the interior of the aperture tube for drawing suspension from the second vessel into the interior of the aperture tube and there being a valve in the connection operable to open or close said connection,
      iii. electronic counting means electrically connected to the liquid in the aperture tube and vessel to respond to the signals produced when particles pass through the aperture into the interior of the aperture tube, with
   B. an optical hemoglobinometer including
      i. a measuring chamber,
      ii. first means for introducing a standard into the chamber and measuring the absorbance thereof,
      iii. second means for introducing a sample of suspension into the chamber and measuring the absorbance thereof,
      iv. means comprising the absorbances and providing a read-out related to said comparison, and
      v. controlling means for programming the operation of said hemoglobinometer,
   C. there being a fluid connection between the second introducing means of the hemoglobinometer and the second vessel, and an electrical circuit for energizing the controlling means, said circuit being closed by the operation of said valve, whereby
the operation of the valve will start particles passing through said aperture while also initiating the operation of said controlling means to draw suspension from said second vessel into said chamber.

12. The combination of claim 11 with a manometer-syphon system connected to the interior of said aperture tube and having a metering section with start and stop electrodes and a column of mercury which is displaced when said valve is opened and return to an equilibrium condition when the valve is closed, said metering section being in the path of movement of said column and serving during such movement to contact first the start and then the stop electrodes there being circuitry in the electronic counting means energizing and de-energizing the same, respectively when the electrodes are contacted so that a volume equal to that of the metering section will be drawn through the aperture and the particles therein counted as the mercury column moves between electrodes, the said electrical circuit for energizing the controlling means being connected to be closed when the mercury column contacts one of said electrodes.

13. Apparatus for counting the white cells in a sample suspension of white cells in a diluent, the red blood cells having been lysed in the suspension to color the suspension with the hemoglobin from the red cells, the suspension having a hemoglobin reagent therein, and measuring the hemoglobin of the same sample suspension, which comprises:
   A. an electric particle counting device wherein particles are caused to move through an aperture whose effective impedance is changed with the passage of each particle therethrough, the change in impedance generating an electrical signal which can be counted, said device including means for moving a metered amount of said sample suspension through said aperture and including means for turning the counting device on and off during the moving to obtain a count of the number of white cells in said metered amount, B. an optical hemoglobinometer operable to measure the hemoglobin content of the sample suspension, C. fluid connection means for drawing a portion of said sample suspension into the hemoglobinometer, and D. programming means for operating the hemoglobinometer arranged to be energized by said means for turning the counting device off and on.

14. The apparatus of claim 13 in which the means for moving includes a manometer-syphon arrangement, there is a body of sample suspension and the movement comprises sucking said metered amount from said body through said aperture, and in which said drawing means is connected to draw said portion from said body.

* * * * *

UNITED STATES PATENT OFFICE
CERTIFICATE OF CORRECTION

Patent No. 3,743,424  Dated July 3, 1973

Inventor(s) Wallace H. Coulter

It is certified that error appears in the above-identified patent and that said Letters Patent are hereby corrected as shown below:

Column 4, line 30, change "deice" to --device--.

Column 8, line 28, change "comprising" to -- comparing --.

Signed and sealed this 26th day of March 1974.

(SEAL)
Attest:

EDWARD M. FLETCHER, JR.    C. MARSHALL DANN
Attesting Officer           Commissioner of Patents